March 15, 1960 M. DREHER 2,928,241
AUTOMATIC CONTROL MECHANISM WITH ACCELERATION-LIMITED
MANUAL SELECTOR
Filed Aug. 1, 1956

INVENTOR.
Max Dreher
BY
Leonard S. Knox
Attorney

United States Patent Office 2,928,241
Patented Mar. 15, 1960

2,928,241

AUTOMATIC CONTROL MECHANISM WITH ACCELERATION-LIMITED MANUAL SELECTOR

Max Dreher, Venice, Calif., assignor to Lear, Incorporated, Santa Monica, Calif.

Application August 1, 1956, Serial No. 601,583

7 Claims. (Cl. 60—39.28)

This invention relates to mechanism for the automatic control of fuel flow to an engine designed to operate at varying ambient barometric pressure, e.g., a gas turbine engine as used aboard aircraft. In particular the invention has reference to mechanism for automatically regulating the feed or flow of fuel to the engine following advancing operation of the fuel valve until the shaft speed is sufficient to produce a compressor output sufficient to augment the air flow to the new value required. Conversely, the mechanism is arranged for automatically delaying reduction in fuel feed when the fuel valve is retarded until the shaft speed is sufficiently reduced to lower the air flow to the required value. The mechanism functions as a closed loop speed governor, automatically controlling the fuel valve to maintain essentially constant engine speed (except for small droop) under changing engine load. Additionally the invention organization provides automatic compensation of fuel supply at various altitudes to avoid increase in engine speed as the ambient air pressure decreases.

The invention control arrangement allows selection of the power level, and hence the speed, of the engine. The "acceleration control" incorporated as part of the mechanism properly meters the acceleration (or deceleration) fuel flow to the engine during acceleration (or deceleration) from one steady state, i.e. speed, to another. The acceleration control prevents overheating of the engine or blow-out in the combustor. Since the performance of a gas turbine engine is proportional to the compressor discharge pressure it is preferred to adjust the speed automatically to maintain a scheduled discharge pressure. Thus the engine rotates no faster than is necessary to suit the ambient temperature, altitude of operation and bleed air demand. Accordingly, engine life is increased, economy of fuel consumption realized and, under certain conditions, a higher rated output air pressure can be specified. However, performance proportional to scheduled discharge pressure is not essential for application of the invention. In a "droop" governor a small change in speed is amplified by the fly-ball governor to control the fuel valve. In the same way the invention mechanism controls to essentially constant speed as an alternative to scheduled discharge pressure.

The mechanism also provides for proportioning the fuel flow, not only with respect to the speed alone but also other variables, such as compressor discharge pressure, to prevent the engine from exceeding its safe operating limits under varying ambient conditions.

In almost all gas turbines, the power output is varied by changing the fuel-air ratio and consequently the gas temperature, viz., air flow is determined and fuel flow is changed. The limits of usable air-fuel ratios are dictated by the upper and lower limits of inflammability and by the maximum allowable turbine inlet temperature. My invention attains the desired relation by means of a simple, reliable and accurately functioning mechanism.

While the ensuing description will, for convenience of exposition, refer to a gas turbine engine, the same is not to be regarded as limited in its application to engines comprehended under this general heading since, as will become apparent, the invention is broadly applicable to any system where a controller is required to automatically regulate a measured though variable input to the controller, and also provides for manual setting of the level of this variable input, during which period of transition the rate of change of the output of the controller is metered to allowable limits. The invention controller is also capable of an output which is a function of more than one input variable.

Further objects will become apparent from the ensuing description which, taken together with the accompanying drawing, discloses a preferred mechanism embodying the invention.

Figure 1:
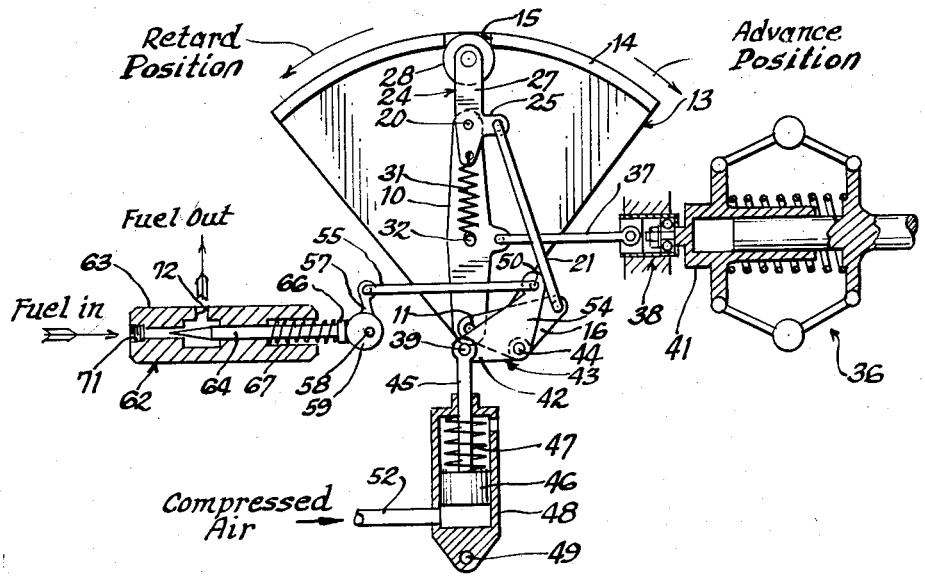
Fig. 1 is a side elevational view, somewhat diagrammatic in character, of a mechanism in accordance with the invention, with a command or control member in mid-position.

Broadly regarded, the invention contemplates the provision of means controlled by movement of a command plate, which constitutes a thrust selector or fuel flow selector, to admit fuel to the engine and simultaneously to position a roller with respect to a slot in the command plate having a predetermined relation to such fuel setting. As engine speed increases pursuant to the implemented fuel flow, the compressor increases its pressure which is then utilized in a piston and cylinder combination and through a suitable linkage to cause further opening of the fuel valve. Concurrently, a centrifugal or other governor which is responsive to engine shaft speed acts to open the fuel valve still further in proportion to the speed and hence the increased demand on the engine. This closed loop type of operation is continued until the roller, which is linked to a governor, is restored to its former position in the slot thereby terminating increase in fuel supply in accordance with the fuel valve position. When the roller is in the slot, fuel flow will continue to be adjusted in the manner of a droop governor. Inasmuch as the invention arrangement is intended to function at various altitudes, the governor compensates for decrease in intake air pressure in a manner to be explained as this description proceeds.

Thus, referring to the drawing, there is shown a crank arm 10 pivoted on an axis 11 supported in suitable fixed bearings. Numeral 13 represents a swingable command plate having a flange or rise 14 interrupted by a notch or fall 15 and supported for rotation on the axis 11.

Arranged for rotation with respect to the axis 11 is a lever arm 16 in the nature of a plate having an aperture for receiving, in a pivotal fashion, the lower end of a link 21. At its upper end the link 21 is pivotally connected to a three-armed lever 24 through one arm 25 thereof. Lever 24 is pivoted at 20 on the arm 10. Another arm 27 of the lever 24 carries a roller or cam 28 and the third arm receives one end of a centering spring 31 which is connected at its other end to a convenient post 32 on the arm 10, whereby the lever 24 is normally urged into a neutral position with the axis of the roller 28 in alignment with the arm 10.

Means are provided for controlling movement of the arm 10 in conjunction with a centrifugal governor 36 of the ball type or its equivalent. Thus, a link 37 is connected between the arm 10 and an adapter 38 which supports outboard end 41 of the governor for rotation but permits axial movement thereof to be transmitted through the link 37.

Lever 16 carries a rocker plate 43 pivoted thereon at 44. One end of the plate 43 is connected, as at 39, through a rod 45 to a piston 46 biased downwardly by a compression spring 47, and is positioned in a cylinder 48 pivoted at 49 to some convenient fixed point. A flexible tube 52 connects the lower end of the cylinder 48 to the source of compressed air (not shown).

The other arm 54 of the plate 43 is connected at 50 via a link 55 to a crank arm 57 fixed on a shaft 58 commonly with a cam 59 which is configured to perform the functions hereinafter attributed thereto. Shaft 58 is supported on fixed bearings (not shown).

A needle valve 62 for regulating fuel flow includes a cylinder 63 and a stem 64 slidable therein. Stem 64 is actuatable by cam 59 through a follower 66, while appropriate bias is provided by a spring 67. Fuel is admitted to the engine via the valve 62 from an inlet port 71 to a discharge port 72.

Operation will now be described.

During operation at essentially constant speed (steady state operation) the parts are in the positions depicted in Fig. 1. Roller 28 is lodged in slot 15 of the command plate 13. However, the angular relation between arms 10 and 24 remains variable upon angular displacement of arm 10. For the small angular displacements possible for the arm 10, the roller 28 will shift slightly radially in the slot 15 but will be incapable of being completely disengaged therefrom.

As the governor 36 responds to normal departures from the steady state speed the link 37 will oscillate the arm 10 and therefore the lever 24. Such latter movement is transmitted through link 21 and lever 16 whereby to oscillate correspondingly the pivot 44. Thus plate 43 is oscillated in direction and magnitude dependent upon the joint input from the governor 36 and from the barometric control unit represented by the cylinder 48 and its appurtenant parts.

As just described operation of the mechanism is like that of a droop (or proportional) governor as supplemented by the correction introduced by the barometric unit. The linkage arrangement, especially the components 10 and 24 thereof, function in a manner to close the fuel valve, through link 55, when the speed is increased, and vice versa. Concurrently the barometric control unit which is responsive to compressor discharge pressure reduces the fuel flow in proportion to the decrease in ambient pressure.

When the throttle control is advanced by clockwise rotation of the command plate 13 (Fig. 2) the notch on fall 15 is carried past the roller or cam 28 and the latter is dislodged to ride beneath the flange or rise 14 which, in turn, causes the lever 24 to shift clockwise to the position shown. In contrast to steady state operation, as described in connection with Fig. 1, the angular relation between lever 24 and arm 10 is fixed. This fixed angular displacement corresponds to the fuel flow for some definite acceleration. Under such circumstances an increase in speed should cause a further increase in fuel-flow, in an amount to further accelerate the engine until roller 28 may snap back into the slot 15 of the command plate. Concurrently the increasing compressor discharge pressure will open the fuel valve 62 further. Thus the link 21 will displace the arm 16 clockwise and its pivot 44, which carries the plate 43, will move in the same direction. Assuming, for clarity in description, that the rod 45 is immobile at this time, movement of the pivot point 44 with respect to pivot point 39 will actuate link 55 to the right and the cam 59 clockwise, whereupon spring 67 is effective to open the valve 62 by lifting the stem 64 from its seat. Consequently, flow of fuel to the engine through ports 71 and 72 is increased.

As the engine accelerates, pressure in the engine compressor is increased and is evidenced through pipe 52 and cylinder 48 to raise the piston 46. Piston rod 45 therefore rocks the lever 43 clockwise about its pivot 44 to open the valve 62 further via the link 55 and the engine is further accelerated.

Concurrently, increase in engine speed causes the governor 36 to draw on the rod 37 which then moves the arm 10 clockwise until roller 28 may re-enter the slot 15 in the command plate 13. Upon such occurrence, the lever 24 and link 21 are restored to their relative positions of Fig. 1, as are the lever 16 and plate 43. However, cam 59 and needle valve 62 remain in the position corresponding to the position of the command plate, whereupon fuel flow is maintained at a greater rate than in Fig. 1, and a higher engine speed is maintained than for the location of the parts in Fig. 1.

Figure 3:
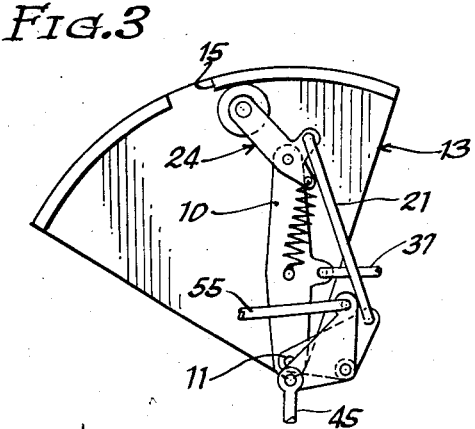
Fig. 3 is also a view like that of Fig. 1, but in part, and with the control member in "retard" position.
Figure 2:
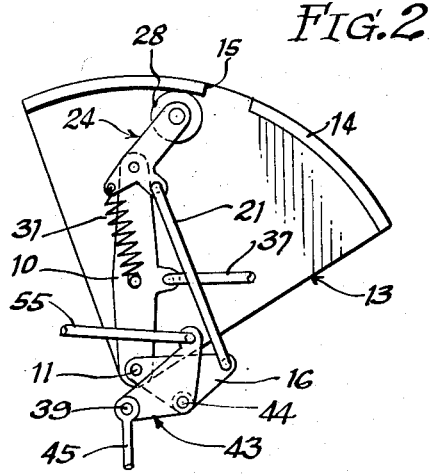
Fig. 2 is a similar view, in part, but with the control member in "advance" position.

For decrease in normal engine speed, the command plate 13 is moved counter-clockwise (Fig. 3), thereby to rock lever 24 in the same sense. All movements of the parts described in connection with Fig. 2 are simply reversed, and their functions in controlling flow of fuel and compressed air correspondingly reversed.

In other words, when the command plate is moved to effect acceleration or deceleration, the re-entry of roller 28 into slot 15 in any position of the command plate establishes a neutral position of lever 24, arm 10, link 21, lever 16 and plate 43 wherein a steady flow of fuel at a predetermined rate is maintained, and such rate corresponds to the position of the command plate.

Figure 4:
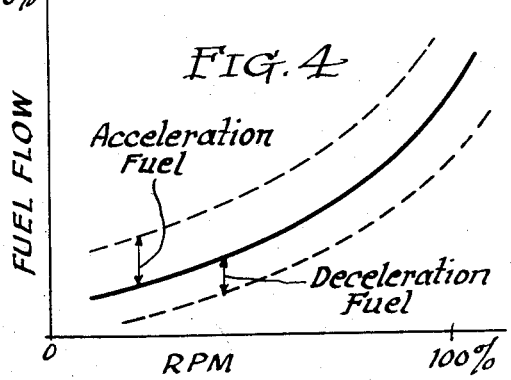
Fig. 4 is a graph to illustrate the approximate relation between rate of fuel flow and engine revolutions.

The three principal conditions just described may be differently understood by reference to Fig. 4 which, taken with the foregoing description, graphically illustrates the relation between fuel flow and engine speed.

The governor 36, which may be of the fly-ball type shown, or of any other suitable type, e.g. servo-type, compensates for variation in the static pressure of the air as the altitude of the craft changes. If, after operation of the command plate to either "advance" or "retard" positions, as above described, the craft ascends to a higher altitude, air pressure will decrease and piston 46 is moved downwardly by the spring 47 against the correspondingly reduced pressure of the air in conduit 52. Thus, plate 43 may rock counter-clockwise to close valve 62 proportionately to the reduced air density while the governor speed will remain constant and arm 10 will maintain its then position. When the craft descends to a lower altitude, the static air pressure will increase, piston 46 is raised and needle valve 62 opened to proportion fuel flow to the greater air density, also while the governor speed remains constant and arm 10 maintained in its then position.

It will be understood that the assumption of a "normal" or "cruising" position of the command plate is only for the purpose of establishing a reference to facilitate the description of the function of the invention. That is to say, if the command plate is regarded as a conventional throttle controller with a "low" position corresponding to "idle" throttle, and an extreme "full" position corresponding to "full" throttle, then the invention mechanism will be understood as introducing a lag in the actual throttle action until such time as the compressor pressure has changed to its optimum value for that selected throttle setting.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

I claim:

1. Mechanism for controlling fuel flow to an engine including a throttle controlling member and a compressed air supply which depends upon a rate of flow of compressed air at some predetermined pressure proportional to rate of flow of fuel for full efficiency comprising an arm supported on a pivot for rocking movement, a cam member including a fall and a rise on either side of said fall thereof for actuating the arm to either side of a normal position responsive to "advance" and "retard" movement of the throttle controlling member respectively, said fall representing normal position of said arm, a valve for regulating flow of fuel, an operative connection between said arm and valve, means actuated by the pressure of the compressed air for affecting the position of the fuel valve co-jointly with actuation thereof by said arm to change flow of fuel in accordance with air pressure, and means responsive to engine speed to restore said arm to the fall of the cam upon attainment of an engine speed corresponding to original displacement of said arm.

2. Mechanism in accordance with claim 1 wherein said last means is a centrifugal type governor.

3. Mechanism in accordance with claim 1 wherein said air-pressure actuated means comprises a cylinder and piston therein and bias means acting upon the piston against the air pressure.

4. Mechanism for controlling full flow to an engine including a throttle control device and a compressed air supply which depends upon a rate of flow of compressed air at some predetermined pressure proportional to rate of flow of fuel for full efficiency comprising a first arm supported on a pivot for swinging movement, a second arm pivoted on said first arm and biased to a neutral position with respect thereto, means connected to the throttle control device for displacing said second arm relatively to said first arm and concurrently displacing said first arm about its pivot, the respective directions and degrees of displacement of said arms being in a direction and in an amount depending on "advance" or "retard" movements of the throttle control device and the amount thereof, a fuel valve, a cylinder and piston therein operable by the compressed air supply, and a linkage between said second arm, valve and piston for operating said valve jointly in proportion to the displacement of said second arm and the air pressure.

5. Mechanism in accordance with claim 4 further characterized by means under the control of engine speed for positioning said first arm in a neutral position upon attainment of an engine speed corresponding to the setting of said throttle control device.

6. Mechanism for controlling fuel flow to an engine including throttle determining means and a compressed air supply which depends upon a rate of flow of compressed air at some predetermined pressure proportional to rate of flow of fuel for full efficiency comprising a first arm supported on a pivot for swinging movement, a second arm pivoted on the free end of said first arm and biased to a neutral position with respect to said first arm, means operable by said throttle determining means for displacing said second arm relatively to said first arm and concurrently displacing said first arm about its pivot, the respective directions and degrees of displacement of said arms being in a direction and in an amount depending on "advance" or "retard" of the throttle determining means and the amount thereof, a fuel valve, a cylinder and piston therein operable by the compressed air supply, a third arm pivoted at one end for rocking movement relatively to said first arm, a link connecting a rotating point of said first arm to the free end of said third arm, a plate pivoted on said third arm, a second link connecting one point of said plate to said valve, an operative connection between said piston and plate whereby actuation of said valve is under the joint control of the throttle and said piston.

7. Mechanism in accordance with claim 6 further characterized by means responsive to engine speed, and a third link connecting said means to said first arm for restoring said arm to neutral position upon attainment of an engine speed corresponding to the position of said throttle determining means.

References Cited in the file of this patent
UNITED STATES PATENTS

| | | |
|---|---|---|
| 2,435,902 | Reggio | Feb. 10, 1948 |
| 2,759,549 | Best | Aug. 21, 1956 |
| 2,779,422 | Dolza et al. | Jan. 27, 1957 |

FOREIGN PATENTS

| | | |
|---|---|---|
| 694,083 | Great Britain | July 15, 1953 |